Figure 1:
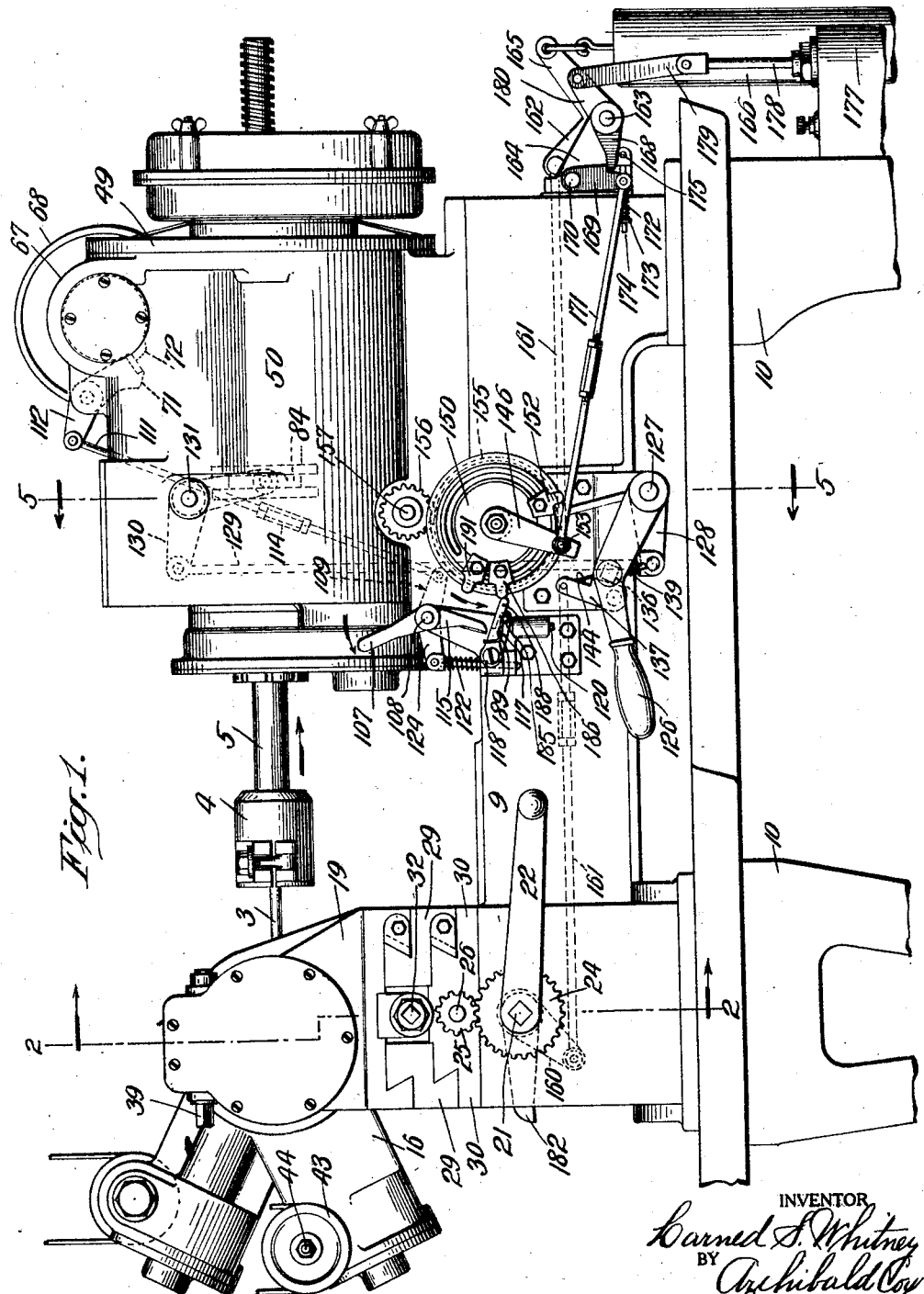

July 6, 1926.

L. S. WHITNEY

MILLING MACHINE

Filed Nov. 11, 1924

1,591,595

9 Sheets-Sheet 1

INVENTOR
Larned S. Whitney
BY Archibald Coy
his ATTORNEY

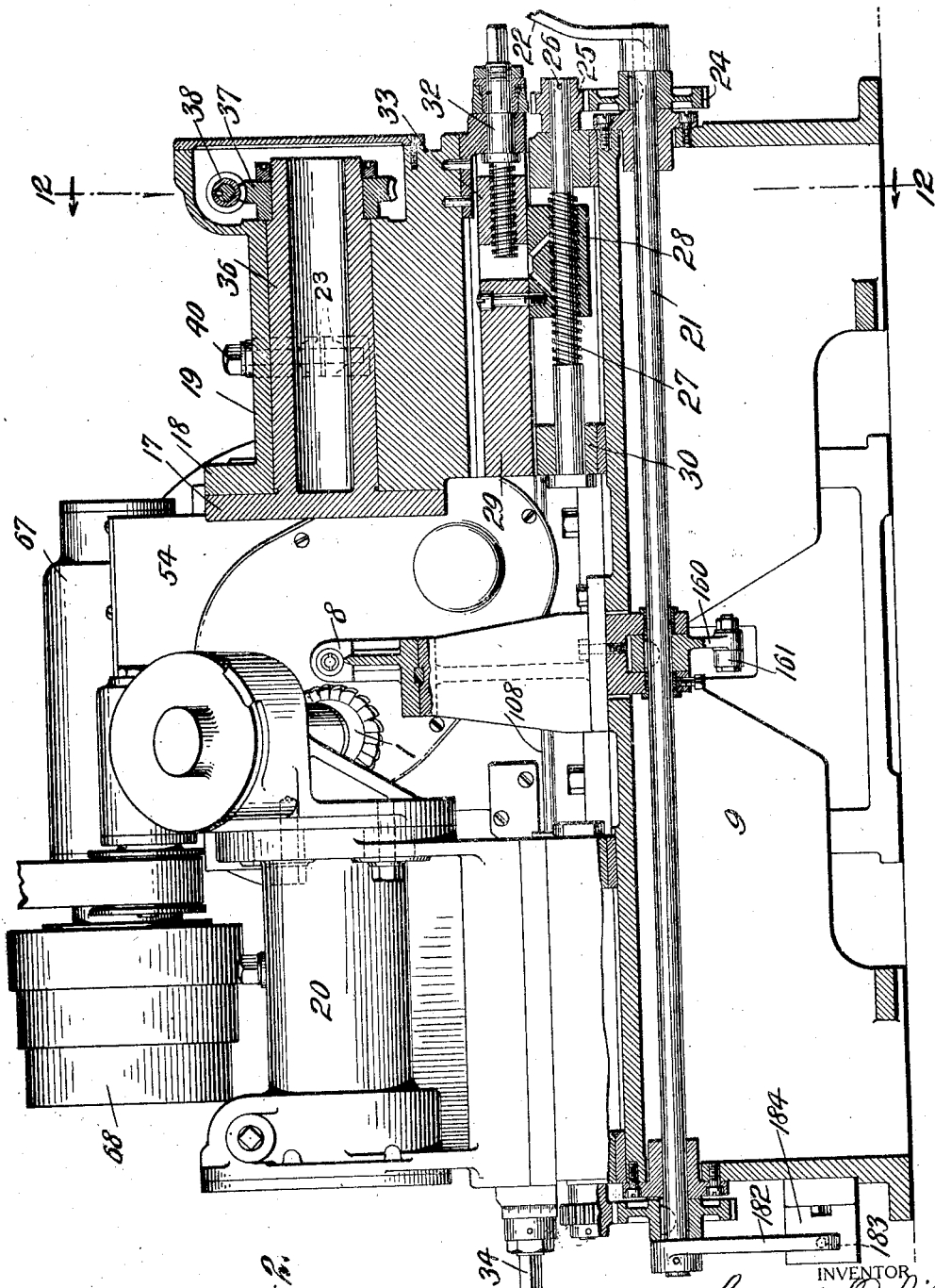

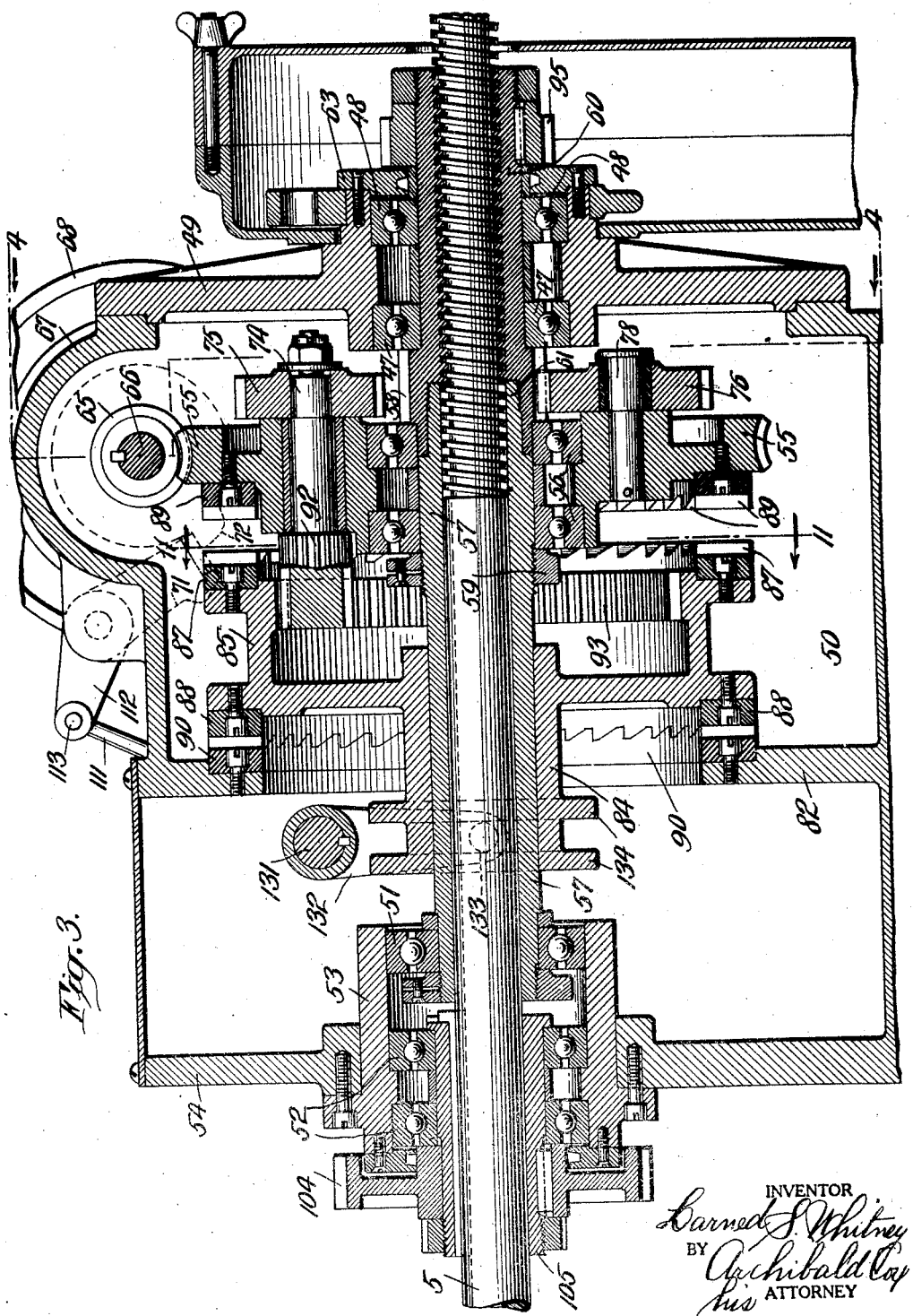

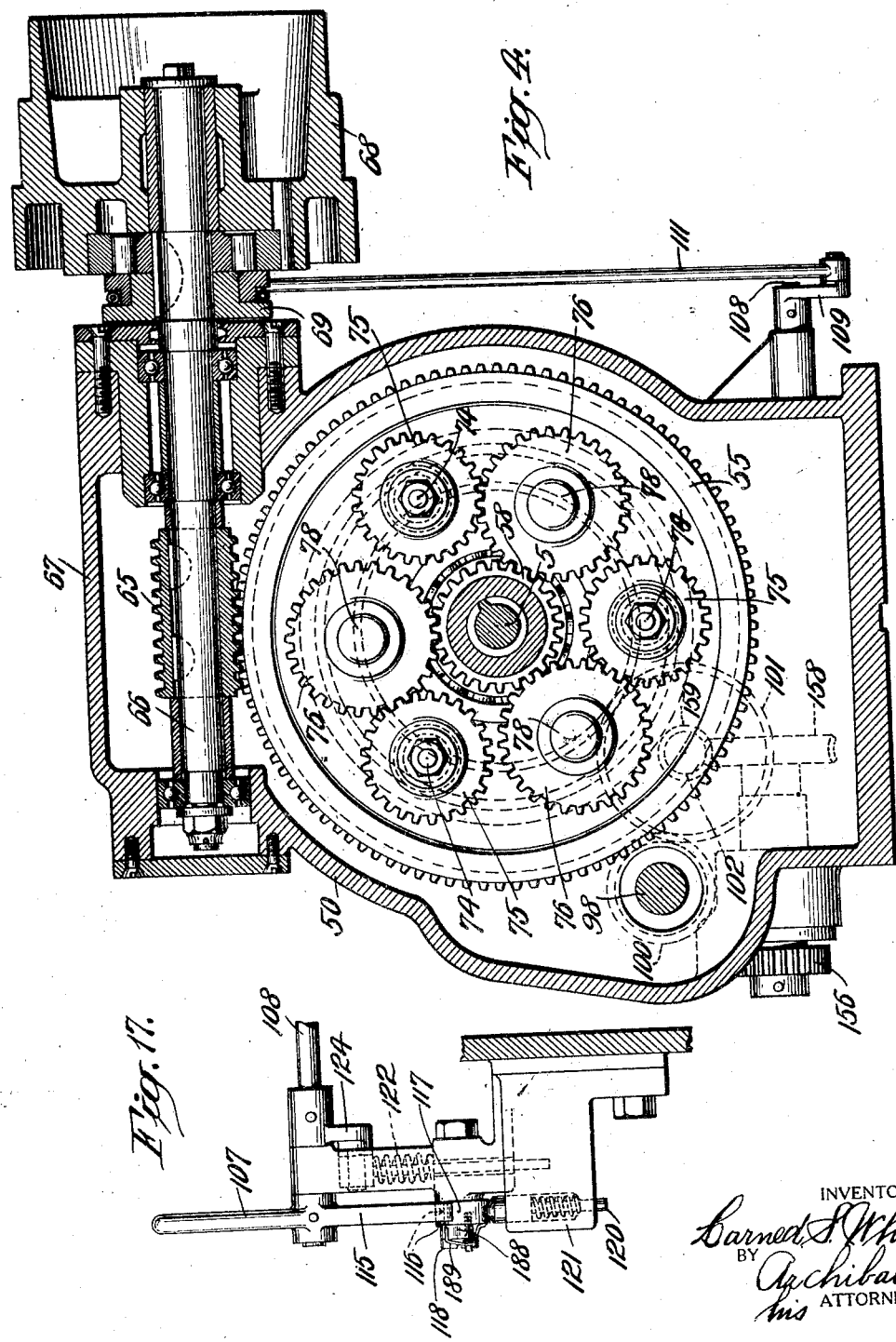

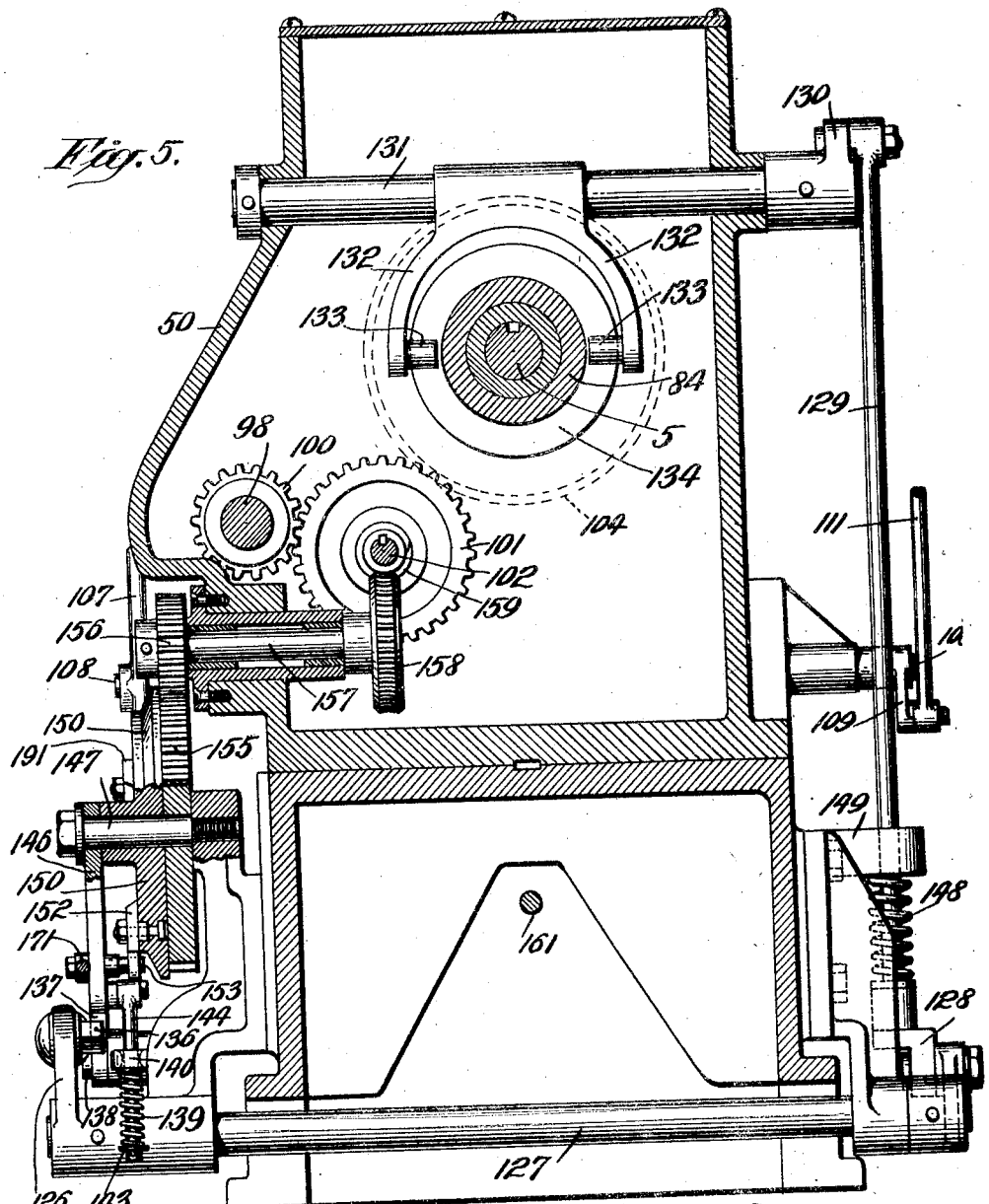

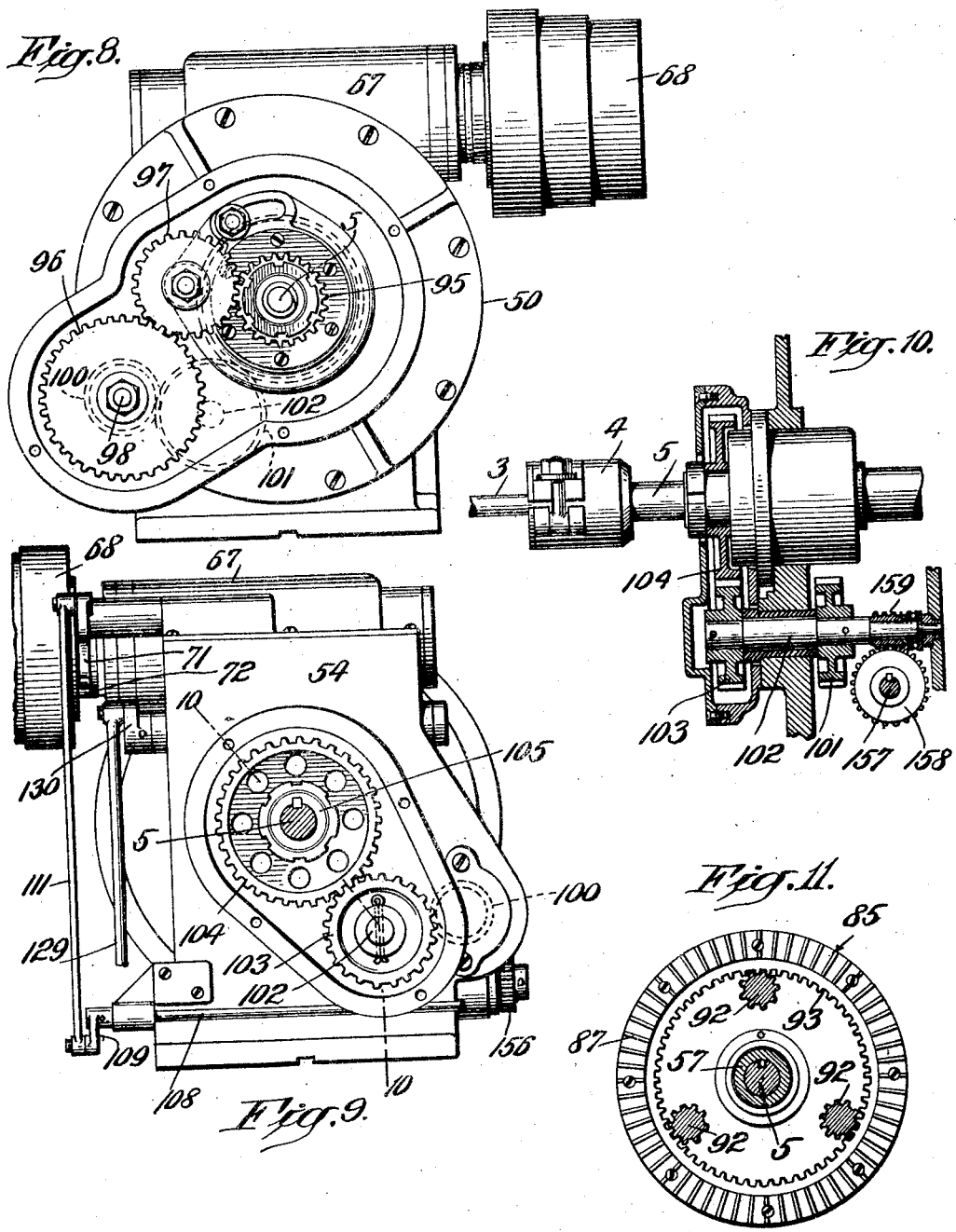

July 6, 1926.
L. S. WHITNEY
MILLING MACHINE
Filed Nov. 11, 1924
1,591,595
9 Sheets-Sheet 7
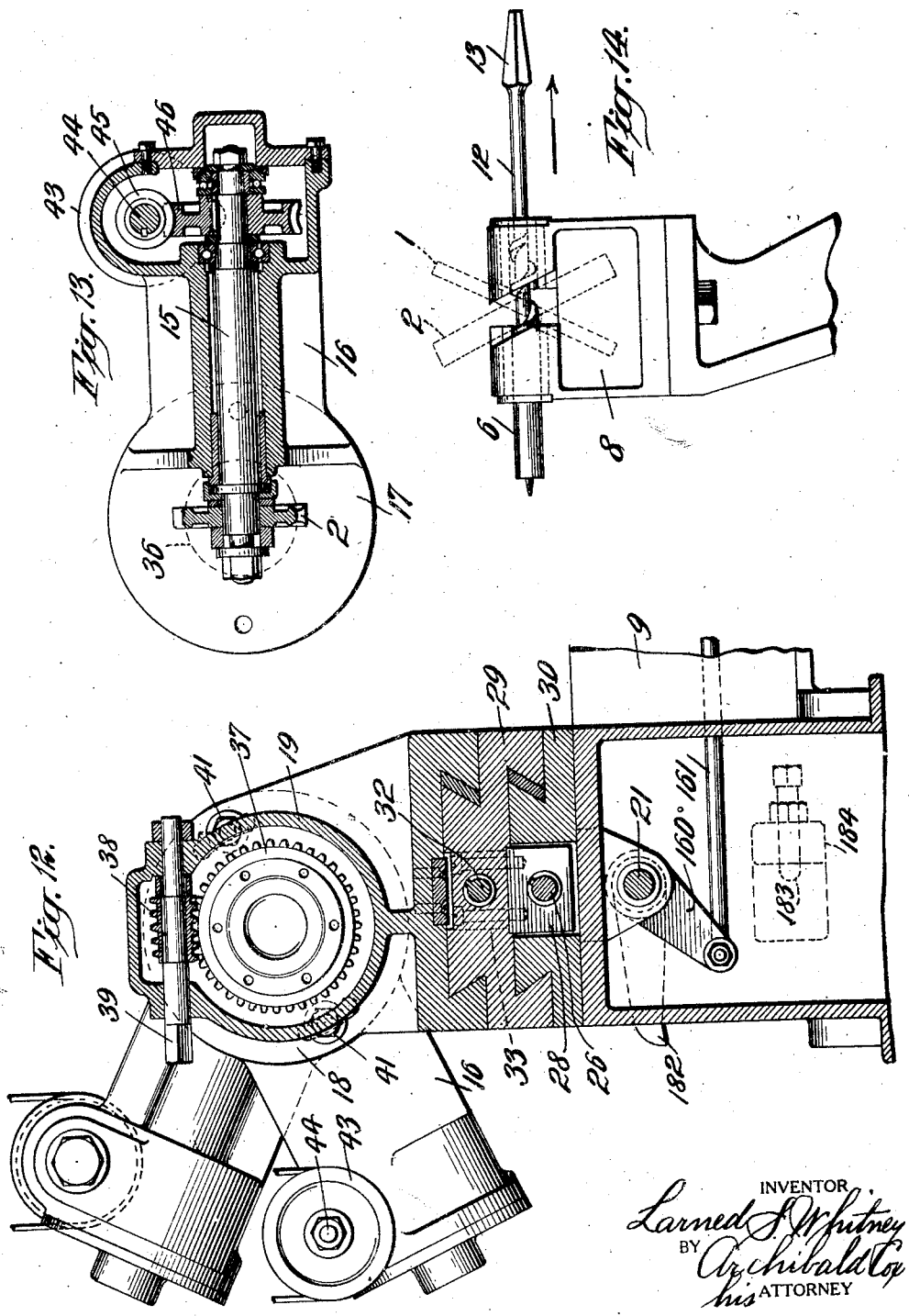

July 6, 1926.

L. S. WHITNEY 1,591,595

MILLING MACHINE

Filed Nov. 11, 1924    9 Sheets-Sheet 8

INVENTOR
Larned S. Whitney
BY Archibald Cox
his ATTORNEY

July 6, 1926.
L. S. WHITNEY
1,591,595
MILLING MACHINE
Filed Nov. 11, 1924
9 Sheets-Sheet 9
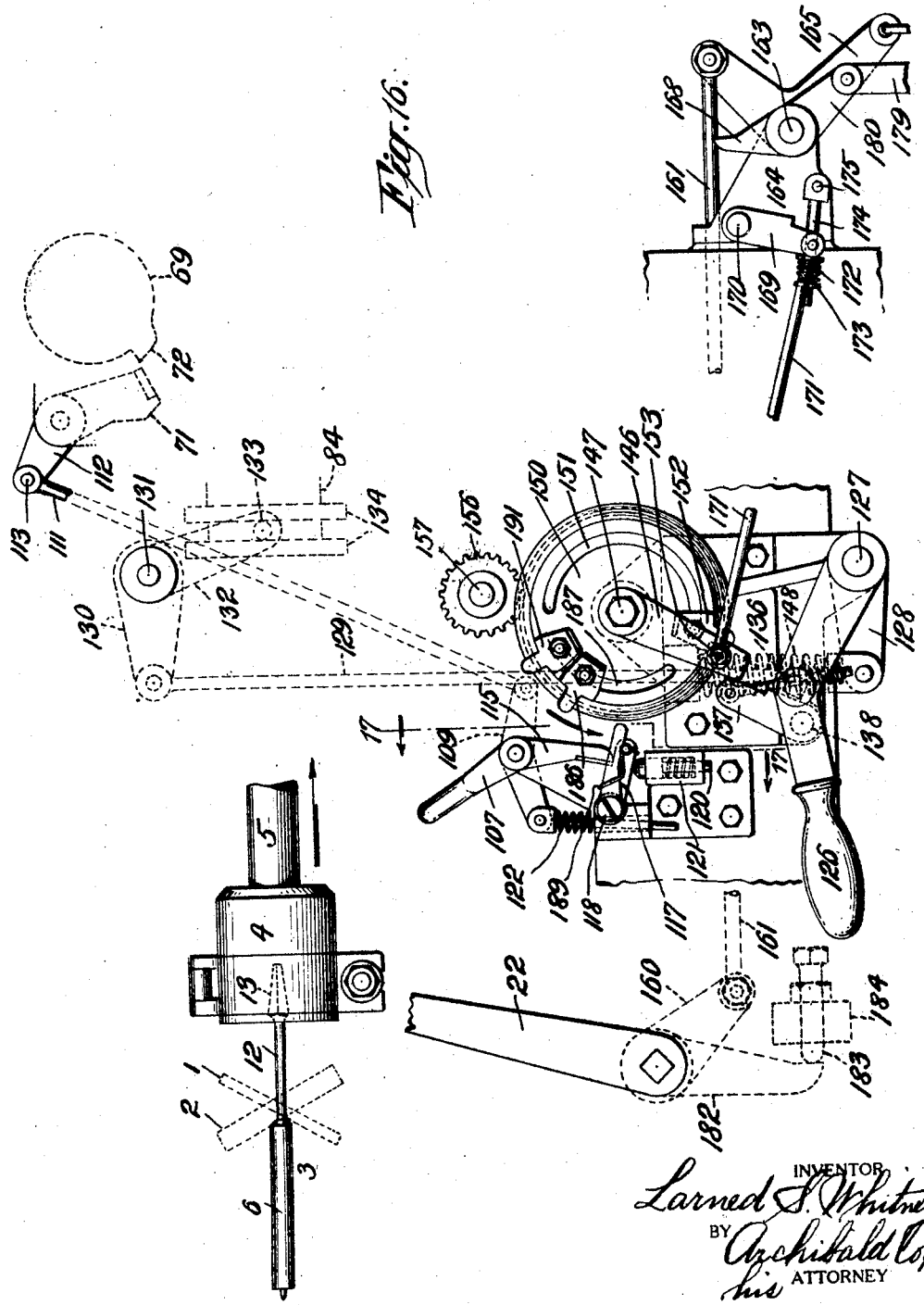

Patented July 6, 1926.

1,591,595

UNITED STATES PATENT OFFICE.

LARNED S. WHITNEY, OF FISKDALE, MASSACHUSETTS.

MILLING MACHINE.

Application filed November 11, 1924. Serial No. 749,115.

The invention relates to milling machines, and more particularly to milling machines adapted for cutting the spiral slot on auger bits.

The milling machine of the present invention has been developed in connection with the new method of making auger bits constituting the subject-matter of my copending application Serial No. 749,114, filed November 11, 1924. According to that method, as distinguished from the methods heretofore employed, all the various steps in making the auger bit are performed by precision machines, such as lathes and milling machines. The spiral slot is described as cut by a milling machine, preferably by the machine which is the subject-matter of the present application. The more commonly practiced method of producing auger bits at the present time is by drop forging, by which the tang, the shank, and the spiral rib which bounds the spiral slot are formed by dies. The end of the bar of steel from which the bit is hammered out is first heated and then subjected to the dies which form the bit. Drop forged bits are often defective by reason of fire cracks and forging defects and vary considerably in length, diameter and general condition. The operations of converting the forged bit into the finished bit are expensive. Moreover by reason of the variation in the sizes and general condition of the drop forged bits it is often impracticable to employ jigs and other fixtures for the cutting of the lips, spurs and lead screw, so that these operations must be performed by hand and therefore at added cost.

The object of the present invention is to produce a milling machine having provision for cutting the spiral slot of an auger bit which is wholly produced from a bar of round stock by machine operations. Preferably the shank and tang are both formed on the bit blank before the spiral slot is cut on the milling machine. By cutting the spiral slot rather than by drop forging it will be obvious that the spiral rib may easily be made concentric with the other parts of the bit such as the tang, shank, spurs and lead screw, and that therefore when the bit is placed in the brace or bit stock it will turn true. Moreover by performing all the operations of producing the bit on one machine or another from a bar of round stock of slightly larger diameter than the finished bit the finishing operations such as cutting the lips, spurs and lead screw may all be performed on jigs or other fixtures, thereby greatly reducing the cost of these operations as performed at present on drop forged bits. Then too it will be obvious that by cutting the spiral slot the stock will be in much better condition for grinding and polishing than when the bit is drop forged. The foregoing and other advantages are secured in auger bit manufacture by means of the milling machine which is hereinafter more fully described and is particularly pointed out in the appended claims.

Figure 15:
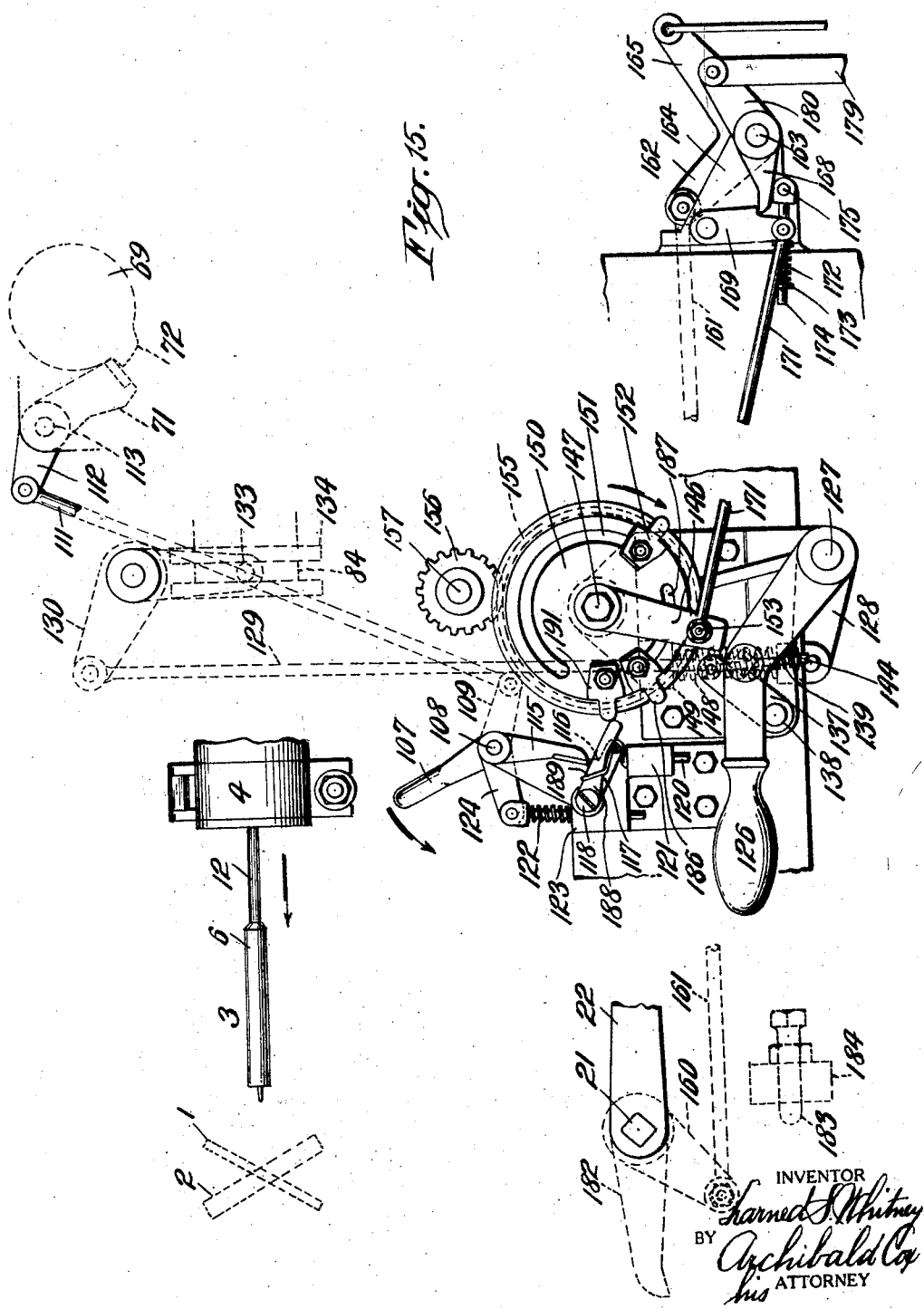

In the accompanying drawings illustrating the preferred form of the invention, Fig. 1 is a side elevation of the improved milling machine; Fig. 2 is an end elevation, on an enlarged scale and partly in section, looking in the direction of the arrows 2—2 of Fig. 1; Fig. 3 is a vertical section taken longitudinally through the spiral feed mechanism; Fig. 4 is a section taken on the line 4—4 of Fig. 3; Fig. 5 is a section on an enlarged scale taken along the line 5—5 of Fig. 1; Fig. 6 is an elevation of the bit blank before the spiral slot has been cut; Fig. 7 is a view of the bit blank after the spiral slot has been cut; Fig. 8 is an end elevation of the gear casing, looking from the right in Fig. 1, with the end cover removed; Fig. 9 is a view similar to Fig. 8 looking from the left in Fig. 1; Fig. 10 is a section taken along the line 10—10 of Fig. 9; Fig. 11 is a section on a reduced scale taken along the line 11—11 of Fig. 3; Fig. 12 is a section taken along the line 12—12 of Fig. 2; Fig. 13 is a section through one of the milling cutter heads; Fig. 14 is a detail illustrating the action of the cutters in cutting the spiral slot in the auger bit; Fig. 15 is a diagrammatic view (partly in side elevation) to illustrate the positions of the parts when a fresh bit blank has been placed in the chuck and the machine started in operation; Fig. 16 is a view similar to Fig. 15, showing the positions of the parts at the beginning of the spiral slot cutting operation; and Fig. 17 (Sheet 4) is a section taken along the line 17—17 of Fig. 16.

The improved milling machine as shown in the illustrated embodiment comprises a pair of oppositely disposed cutters 1 and 2, set at an angle with each other, as shown diagrammatically in Fig. 14. The angular difference between the positions of the cutters will be determined partly by the pitch of the spiral slot and partly by the bevel or by the undercut of the walls of the spiral rib which bounds the spiral slot. The cutters are disposed on opposite sides of the bit blank 3 and operate simultaneously thereon, one of the cutters acting as a roughing cutter and forming one side of the spiral rib and the other cutter acting as a finishing cutter and forming the other side of the spiral rib. The roughing cutter 1 which is of less width than the finishing cutter 2 is set so as to cut somewhat in advance of the latter. The bit blank 3 is held by its tang 13 in a chuck 4 supported on the forward end of the feed spindle 5. During the milling operation by which the cutters 1 and 2 form the spiral slot in the bit blank the body part 6 of the bit blank is supported in a guide or bushing 8 rising from the frame 9 of the machine which is supported by the legs 10.

Before the bit blank is placed in the milling machine the shank part 12 has been turned down and the tang 13 formed thereon. The spiral slot is cut from the junction of the body part 6 and the shank 12 toward the cutting end of the bit. The spiral slot terminates short of the end of the bit to leave enough stock out of which to form the lips or cutting edges and the spurs. When the bit blank has been placed in the chuck the feed spindle 5 is run forward until the body part 6 of the bit blank is beyond the cutters. The cutters are then advanced toward each other until they touch the shank 12. Thereupon the feed spindle is moved in the reverse direction (at the same time being rotated) so that the cutters will form in the body part of the bit a spiral slot of the requisite pitch. On the completion of the milling operation the cutters are disengaged from the work, being moved outwardly from each other, and the bit blank is entirely withdrawn from the supporting guide 8. The milling cutters are located opposite the middle of the guide 8 and diagonally arranged slots in the guide accommodate the cutters.

The cutter 2 is mounted on the end of a spindle 15 journaled in a head 16 adjustably secured by its flange 17 to the flange 18 of a housing 19 which is movable toward and from the bit blank synchronously with the housing 20 of the cutter 1 by means of the feed shaft 21 provided on its forward end with the handle 22. On the front end of the shaft 21 is a gear 24 which meshes with a pinion 25 mounted on the outer end of a shaft 26 provided with a worm 27 which passes through a block 28 secured to a dove-tailed slide 29, which slides toward and from the bit blank on the dove-tailed guide 30 in which the shaft 26 is journaled. In order that the housing 19 may be adjusted toward and from the bit blank independently of the housing 20, it is provided with a screw 32 which passes through the block 33 extending transversely across the slide 29. When the screw 32 is turned the housing slides on the upper dove-tailed part of the slide 29, the base of the housing being dove-tailed to fit thereon. All these parts for moving the cutter 2 toward and from the bit blank have their counterparts connected with the housing 20 for moving the cutter 1 toward and from the bit blank. Thus it will be understood that when the feed shaft 21 is turned the cutters are advanced toward or retracted from the bit blank synchronously, and that when the screws 32 and 34 are turned the cutters are advanced toward and retracted from the bit blank independently of each other.

The head 16 is provided with a bearing 36 which is disposed at right angles to the longitudinal axis of the head and which is received in the housing 19. On the forward end of the bearing 36 is a worm gear 37 which meshes with a worm 38 having its outer projecting end 39 squared to receive a handle by which the angular position of the cutter 2 may be adjusted. The housing 19 is provided with split blocks 23 and when the cutter has been adjusted angularly the bolt 40 is tightened to close the blocks on the bearing 36 and the bolts 41 are tightened to secure the flanges 17 and 18 together. The cutter 2 is driven by a pulley 43 mounted on the outer end of a shaft 44 provided with a worm 45 which meshes with a worm gear 46 mounted on one end of the cutter spindle 15. The parts for supporting the cutter 1 in the housing 20 are constructed exactly like and have the same mode of operation as the parts connected with the cutter 2.

The feed spindle 5, which carries on its forward end the chuck 4, is mounted to have both an axial and a rotative movement. For this purpose it is journaled at its rear end in a pair of ball bearings 47 and 48 mounted in the end wall 49 of the gear casing 50, and at its forward end in the ball bearing 51 and a pair of ball bearings 52 supported in a bushing 53 mounted in the end wall 54 of the casing 50. The axial movements for advancing the bit blank through and retracting it from the guide 8 are imparted to the feed spindle by a system of gears enclosed in the gear casing 50. This gear system comprises a worm gear 55 mounted by means of the pair of ball bearings 56 on the sleeve 57 which loosely encloses the middle part of the feed spindle. The worm gear 55 is held against axial movement by the gear 58 and the check nut or split collar 59. The gear 58 is mounted on the forward end of a threaded sleeve 60 and is secured to the sleeve 57 by means of the threaded portion 61 of the latter. The threaded sleeve receives the threaded rear end of the feed spindle and supports the ball bearings 47 and 48 which are held in the end wall 49 between the gear 58 and the cap 63.

The worm gear 55 is driven by a worm 65 mounted on a shaft 66 journaled in a housing 67 mounted on the gear casing 50. On the outer end of the shaft 66 is loosely mounted a step pulley 68 which is adapted to drive the shaft 66 through the clutch mechanism 69, when the dog 71 is disengaged from the latch 72 of the clutch mechanism. This clutch mechanism is of well known construction and needs no detailed description. It is sufficient to say that the pulley 68 is driven continuously, but that it does not drive the shaft 66 and the parts connected with it so long as the dog 71 is in engagement with the latch 72. When the dog 71 is disengaged from the latch 72 the pulley 68 is operatively connected with the shaft 66 through the clutch mechanism. The latch 72 then rotates with the shaft until the dog is again interposed in its path of travel.

When the feed spindle is moved in a left hand direction (viewing Fig. 1) to advance the bit blank through the guide 8 into position for the commencement of the slot cutting operation, the feed spindle is caused to move several times faster than when it travels in a right hand direction (viewing Fig. 1) to effect the cutting of the spiral slot. This mode of operation is secured by changing the operative connections between the worm gear 55 and the feed spindle according as the latter is to be moved in the one direction or the other. During the slot cutting operation the driving connection between the worm gear 55 and the feed spindle is made as follows:—Journaled in the body of the worm gear 55 are three shafts 74, each carrying at its right hand end (viewing Fig. 3), a gear 75. Each gear 75 meshes with a gear 76 mounted on a stud 78 secured in the worm gear 55. The gears 76 all mesh with and drive gear 58 and thereby impart an axial movement to the feed spindle through the threaded sleeve 60. As the worm gear 55 rotates in a clockwise direction, viewing Fig. 4, the revolution of the gears 75 and 76 about the feed spindle causes the gears 76 to rotate on their axes and thereby turn the gear 58 and the threaded sleeve 60 by which the feed spindle is caused to travel axially in a right hand direction, viewing Fig. 3.

When the feed spindle is to be moved to the left to advance the bit blank through the guide into position for the slot cutting operation, the driving connection between the worm gear 55 and the spindle is made as follows:—On the sleeve 57 is mounted a flanged collar 84 carrying a movable drum or clutch member 85 having on one edge of its perimeter a toothed ring 87 and on the other edge of its perimeter a toothed ring 88. The teeth of the ring 87 are adapted to engage with the teeth of the ring 89 secured to the worm gear 55, and the teeth of the ring 88 are adapted to engage with the teeth of the ring 90 secured to the internal wall 82 of the gear casing 50. When the feed spindle is moved to the right the ring 87 is in engagement with the ring 89 and under these conditions the drum 85 turns with the worm gear 55. When on the other hand the feed spindle is to be moved to the left the ring 88 is in locking engagement with the ring 90, as shown in Fig. 3, and the drum 85 is prevented from turning. Under these conditions the rotation of the worm gear 55 causes the three pinions 92 formed on the left hand ends of the shafts 74 to travel over the internal gear 93 cut in the perimeter of the drum 85. This causes the gears 75 to rotate relatively rapidly and thereby impart a relatively rapid rotation to the gear 58 and the threaded sleeve 60. The pinions 92, the gears 75, and the gear 58 are so related in size that the travel of the feed spindle in the left hand direction is about three times its rate of travel in the right hand direction. It will be obvious that by changing the sizes of the gears the difference between the rate of travel of the feed spindle in the two directions may be increased or decreased.

In order that a spiral slot may be cut in the bit blank a rotative movement is imparted to the feed spindle while it is traveling axially. For this purpose a gear 95 mounted on the outer end of the threaded sleeve 60 drives the gear 96 (Fig. 8) through the idler gear 97. The gear 96 is mounted on one end of a shaft 98 journaled in the end wall 49 and the end wall 54 of the gear casing. On the other end of the shaft 98 is a pinion gear 100 which meshes with an idler gear 101 mounted on a shaft 102 (Fig. 10) journaled in the wall 54. On the forward end of the shaft 102 is a second idler gear 103 which meshes with and drives a gear 104 fixedly mounted on the bushing 105 on which the pair of ball bearings 52 are mounted. The bushing 105 has a spline and slot connection with the forward end of the feed spindle so as to permit the axial movement of the spindle through the bushing while the latter turns the spindle. By varying the sizes of the gears 95 and 96 the pitch of the spiral slot to be cut in the bit blank may be varied as desired.

When a bit blank has been placed in the milling machine with its tang in the chuck 4, the machine is started in operation by turning the handle 107 in a counter-clockwise direction to disengage the dog 71 from the latch 72. The handle 107 is fixed on the front end of a transverse shaft 108, on the rear end of which (Fig. 5) is fixed an arm 109 connected by means of the link 111 with the arm 112 fixed on the pivot pin 113 on which the dog 71 is mounted. The link 11 is provided with a turn buckle 114 to vary the operative position of the dog 71. The machine continues in operation so long as the lower end of the downwardly projecting arm 115 of the handle 107 is held engaged by the notch 116 of the latch or arm 117 (Figs. 15, 16 and 17) pivoted at 118. The arm 117 is held in engagement with the arm 115 by means of a spring pressed plunger 120 mounted to slide vertically in a boss 121. When the arm 117 is disengaged from the arm 115 (in the manner to be explained presently) the spring 122 interposed between the boss 123 and the outer end of an arm 124 fixed on the shaft 108, acts to turn the shaft 108 and the handle 107 in a clockwise direction thereby placing the dog 71 in the path of rotation of the latch 72 to stop the machine.

Since the forward movement of the bit blank through the guide 8 is simply for the purpose of putting the bit blank in position for the slot cutting operation by the cutters 1 and 2, the drum 85 is moved into locking engagement with the stationary ring 90 when the machine is started in operation so as to cause the spindle to move forward at its greater speed. The drum 85 is moved into locking engagement with the stationary ring 90 by lifting the handle 126 mounted on the front end of a transverse shaft 127 (Fig. 5), the rear end of which carries an arm 128. The free end of the arm 128 is connected by the link 129 with the outer end of an arm 130 secured to the pin 131 which passes through a yoke having two downwardly extending arms 132 (Fig. 5) which straddle the collar 84 and are provided at their lower ends with inwardly projecting pins 133 adapted to be loosely engaged by the flanges 134 of the collar 84.

When the handle 126 is lifted to throw the drum 85 into locking engagement with the stationary ring 90 the square boss 136 on the rear side of the handle is caught and held by a latch or notched arm 137 pivoted at 138 on the machine frame. The bit blank continues to advance through the guide so long as the handle 126 is held in its raised position by the arm 137. The arm 137 is yieldingly held in its operative position by means of a spring 139 interposed between the boss 140 (Fig. 5) on the machine frame and a washer 143 held on the lower end of a rod 144 pivotally connected with the free end of the arm 137. The arm 137 is in the path of oscillation of an arm 146, loosely mounted on the stud 147. When the lower end of the swinging arm 146 strikes the arm 137 (as will be presently explained) to disengage it from the handle 126, the spring 148 surrounding the lower end of the link 129 and interposed between the bracket 149 and the free end of the arm 128, acts to move the link 129 downwardly and thereby disengage the drum 85 from the stationary ring 90 and shift the drum into engagement with the worm gear 55. Thereupon the feed spindle moves in the reverse direction and the bit blank is withdrawn relatively slowly through the guide 8 during which time the spiral slot is cut.

When the bit blank has advanced through the guide 8 into position for the beginning of the milling operation, the handle 126 is disengaged from the notched arm 137 by the following means:—Mounted on the stud 147 is a slotted disc 150. Adjustably secured in the segmental slot 151 of the disc is a dog 152 adapted when the disc rotates in a clockwise direction to contact with a pin 153 projecting rearwardly from the lower end of the swinging arm 146 and move the arm into contact with the free end of the notched arm 137 to disengage the latter from the square boss 136 of the handle 126. While the feed spindle is traveling in a left hand direction to advance the bit blank through the guide 8 the disc 150 rotates in a clockwise direction, as indicated in Fig. 15. On the rear side of the disc is mounted a gear 155 which meshes with and is driven by a pinion 156 mounted on the forward end of a shaft 157 journaled in the front part of the gear casing 50. On the rear end of the shaft 157 is mounted a worm gear 158 which meshes with and is driven by a worm 159 mounted on the shaft 102. The position of the dog 152 on the disc 150 is determined by the length of the body part of the bit, and as the body part varies in length the dog 152 is adjusted accordingly, so that the handle 126 will be released and the drum 85 shifted into engagement with the worm gear 55 when the bit blank is in position for the beginning of the milling operation.

At the same time the handle 126 is released and the drum 85 moved into engagement with the worm gear 55 to cause the bit blank to be withdrawn through the guide 8 for the milling operation, the milling cutters are automatically brought into position to cut the slot. For this purpose the shaft 21 is provided with a downwardly extending arm 160 the free end of which is connected by means of the adjustable link 161 with the free end of the arm 162 of a bell crank pivoted at 163 on a bracket 164 secured to the end of the machine frame. The other arm 165 of the bell crank carries a weight 166 which serves to pull the link 161 to the right (viewing Fig. 1), thereby turning the shaft 21 in a counter-clockwise direction to advance the milling cutters toward each other into position to cut the spiral slot.

On the completion of the slot cutting operation the operative turns the handle 22 in a clockwise direction from the position shown in Fig. 16 to the position shown in Figs. 1 and 15, thereby withdrawing the cutters from the work and moving the link 161 to lift the weight 166. The weight is held in its raised position by the engagement of the arm 168 fixed on the shaft 163 with a latch or notched arm 169 pivoted at 170 on the bracket 164. The lower free end of the notched arm 169 is pivotally connected by means of the adjustable link 171 with the free end of the arm 146. The arm 169 is yieldingly pressed into locking engagement with the arm 168 by means of a spring 172, one end of which takes against the free end of the arm 169 and the other end against the washer 173 fixed on the outer end of a pin 174 pivotally mounted at 175 on the bracket 164. When the rotation of the disc 150 brings the dog 152 into engagement with the pin 153 on the rear side of the arm 146, the link 171 is moved to the left disengaging the notched arm 169 from the arm 168 thereby permitting the weight 166 to drop, turning the shaft 21 and advancing the cutters toward the work. In order that there may be no shock as the weight 166 descends, a dash pot 177 is provided, the piston rod 178 of which is connected by a link 179 with an arm 180 mounted on the shaft 163. The depth of the spiral slot cut by the milling cutters is determined by the engagement of an arm 182 secured to the rear end of the shaft 21 with an adjustable stop 183 mounted on a bracket 184 secured to the machine frame.

It will conduce to clarity of description and a more ready understanding of the mode of operation of the machine in cutting the spiral slot to assume at this stage that the bit blank has been placed in the chuck, that the handle 107 has been turned to start the machine in operation and that the handle 126 has been lifted to cause the bit blank to advance through the guide 8. When the bit blank has advanced through the guide 8 into position for the slot cutting operation the dog 152 engages the pin 153 on the arm 146 and moves the arm 146 against the latch arm 137 to disengage it from the handle 126 so as to permit the drum 85 to be moved into engagement with the worm gear 55 to cause the feed spindle to travel in the reverse direction to withdraw the bit blank through the guide. This reversal of the axial movement of the feed spindle is accompanied by a reversal of its rotative movement so that the disc 150 now travels in a counter-clockwise direction. At the same time the arm 146 is disengaging the arm 137 from the handle 126 it disengages the latch arm 169 from the arm 168 thereby permitting the descent of the weight 166 to turn the shaft 21 to advance the cutters 1 and 2 toward each other and into position for the slot cutting operation. The positions of the parts in the beginning of the slot cutting operation is shown in Fig. 16.

During the spiral slot cutting operation the feed spindle 5 travels in the direction of the arrow (Fig. 16) and has a rotative movement in a counter-clockwise direction so as to form a right hand spiral rib on the bit. When the spiral slot has been cut (enough stock being left at the end of the bit to form the lips and spurs) the dog 186 adjustably secured in the segmental slot 187 in the disc 150, engages with the end of the arm 188 and acts to disengage the latch arm 117 from the handle 107, as shown in Fig. 1. The arm 188 is pivoted at 118 and is yieldingly held against the pin 185 on the latch arm 117 by means of the spring 189. The release of the handle 107 from the latch arm 117 permits the spring 122 to move the dog 71 into the path of the latch 72 to bring about the stopping of the machine.

When the machine has stopped the operative turns the handle 22 from the position shown in Fig. 16 to the position shown in Figs. 1 and 15. The turning of the handle 22 disengages the cutters from the work and from the guide 8 and at the same time lifts the weight 166 which is held in its raised position by the engagement of the arm 168 with the latch arm 169, the travel of the dog 152 in the counter-clockwise direction during the slot cutting operation permitting the spring 172 to force the arm 169 into position to catch the arm 168 when it is lowered while the arm 165 and the weight 166 are raised. The positions of the parts at this point in the slot cutting operation is shown in Fig. 1.

When the cutters have been disengaged from the work and from the guide 8 the operative turns the handle 107 to the left to start the machine in operation again to effect the withdrawal of the bit blank from the guide. Since at the beginning of this operation the dog 186 is in contact with the arm 188 it is necessary for the operative to hold the handle 107 until the dog 186 has moved clear of the arm 188, at which time the spring pressed plunger 120 forces the latch arm 117 up into holding engagement with the lower end of the handle 107. The machine then continues to operate until the dog 191 contacts with the end of the arm 188 thereby again disengaging the latch arm 117 from the lower end of the handle 107 and stopping the machine. This occurs when the bit blank has been completely withdrawn from the guide, as shown in Fig. 15, the position of the guide being indicated by the cutters 1 and 2.

The mode of operation of the improved milling machine may now be briefly recapitulated as follows:—After the bit blank has been withdrawn from the guide 8 on the completion of the slot cutting operation, the dog 191 remains in contact with the end of the arm 188, as shown in Fig. 15. Thus it will be understood that when a fresh bit blank is placed in the chuck and the machine is started in operation, (the disc 150 now turning in a clockwise direction when the handle 126 is lifted to throw the drum 85 into engagement with the stationary ring 90 to cause the bit blank to travel toward the guide 8), the operative will hold the handle 107 until the dog 191 has cleared the end of the arm 188. As the disc 150 continues to rotate in a clockwise direction while the bit is advancing through the guide, the dog 186 moves into contact with the end of the arm 188, but inasmuch as this arm is yieldingly connected with the latch arm 117, the dog 186 simply lifts the arm 188 as it passes by it, the spring 189 returning the arm 188 to normal position on the latch arm 117.

The disc 150 continues to rotate in a clockwise direction (while the bit blank is advancing through the guide 8 into position for the beginning of the slot cutting operation), until the dog 152 strikes the pin 153 on the rear side of the arm 146. As the disc 150 continues to rotate with the dog 152 in engagement with the pin 153, the link 171 is moved to the left disengaging the latch arm 169 from the arm 168, thereby permitting the weight 166 to descend and draw the link 161 to the right. This movement causes the shaft 21 to be turned in a counter-clockwise direction and the cutters to be advanced toward each other and into position for cutting the slot. When the shaft 21 is turned the handle 22 is raised from the position shown in Figs. 1 and 15 to the position shown in Fig. 16. At about the same time that the latch arm 169 is disengaged from the arm 168 to cause the cutters to be advanced into cutting position, the arm 146 disengages the latch arm 137 from the handle 126, thereby permitting the spring 148 to disengage the drum 85 from the ring 90 and move it into engagement with the worm gear 55 to cause the feed spindle to travel in the right hand direction to withdraw the bit blank through the guide for the slot cutting operation.

The shifting of the drum 85 from engagement with the ring 90 to engagement with the worm gear 55 causes the disc 150 to rotate in a counter-clockwise direction as indicated in Fig. 16. Disc 150 continues to rotate in this direction until the dog 186 strikes the end of the arm 188 and disengages the latch 117 from the handle 107, thereby stopping the machine. This occurs when the spiral slot reaches almost the cutting end of the bit, leaving only enough stock for the lips and spurs. The operative now turns the handle from the position shown in Fig. 16 to the position shown in Figs. 1 and 15, thereby disengaging the cutters from the slot and from the guide, and lifting the weight 166 which is held in its raised position by the engagement of the arm 168 with the latch arm 169. When this has been done the operative again starts the machine in operation by turning the handle 107, holding the handle until the dog 186 has passed beyond the end of the arm 188. The feed spindle now continues to move toward the right to entirely withdraw the bit from the guide 8. When the feed spindle has moved far enough to the right to permit the bit to be removed from the chuck and a fresh blank to be placed therein, the machine is stopped by the dog 191 coming in contact with the arm 188 as shown in Fig. 15.

Having thus described the invention what I claim as new is:—

1. A machine for milling the spiral slot of a bit blank provided with a body portion, a shank and a tang, comprising, a spindle mounted to move axially and rotatively and carrying a chuck to hold the bit by its tang, a pair of cutters arranged to operate on opposite sides of the bit and mounted to move toward and from each other, means for imparting a simultaneous axial and rotative movement to the spindle so as to effect the cutting of the spiral slot, means for advancing the bit to bring the shank opposite the cutters, a weight connected with the cutters and arranged when released to move the cutters toward each other to slot cutting position, and means operative when the shank portion of the bit is opposite the cutters to release the weight and to cause the spindle to be moved in the direction to effect the cutting of the spiral slot.

2. A machine for cutting the spiral slot of an auger bit comprising, a cutter, a spindle carrying a chuck for holding the bit, means for supporting the spindle so that it may have an axial and a rotative movement, said spindle being provided with a threaded portion, a threaded sleeve mounted on the threaded part of the spindle, a gear fixed on the sleeve, a bushing having a sliding connection with the spindle and arranged to turn therewith, a gear fixed on the bushing, means for turning the two gears to impart a simultaneous axial and rotative movement to the spindle, means for reversing the direction of the axial and rotative movements of the spindle, a disc driven by the means for actuating the spindle, said disc turning in the one direction when the spindle advances toward the cutter and in the other direction when the spindle is retracted from the cutter, means for setting the machine in motion to bring the bit into position for the beginning of the slot cutting operation, and means controlled by the disc for advancing the cutter to slot cutting position and for causing the spindle to travel in the direction to effect the cutting of the spiral slot.

3. A machine for cutting the spiral slot of an auger bit comprising, a cutter, a spindle carrying a chuck to hold the bit, said spindle having a threaded portion, a threaded sleeve mounted on the threaded part of the spindle, a gear fixed on the sleeve, a bushing having a sliding connection with the spindle and arranged to turn therewith, a gear fixed on the bushing, means for turning the gears to impart a simultaneous axial and rotative movement to the spindle, means for reversing the direction of the axial and rotative movements of the spindle, a weight arranged when released to move the cutter into slot cutting position, means connected with the means for actuating the spindle to release the weight when the bit is in position for the slot cutting operation and means for stopping the machine on the completion of the cutting of the slot.

4. A machine for milling the spiral slot of an auger bit comprising, a spindle mounted to move axially and rotatively and carrying a chuck for holding the bit, means for imparting a simultaneous axial and rotative movement to the spindle, means for reversing the axial and rotative movements of the spindle, a cutter mounted to move toward and from the bit, a weight connected with the cutter and arranged when released to move the cutter toward the bit into slot cutting position, means for holding the weight in raised position, and means operative when the bit has been moved into position for the beginning of the slot cutting operation to release the weight.

5. A machine for milling the spiral slot of an auger bit comprising, a spindle mounted to move axially and rotatively and carrying a chuck for holding the bit, means for imparting a simultaneous axial and rotative movement to the spindle, means for reversing the axial and rotative movements of the spindle, a cutter mounted to move toward and from the bit, a weight connected with the cutter and arranged when released to move the cutter into slot cutting position, means for holding the cutter in raised position, a disc connected with and driven by the means for actuating the spindle, a handle for starting the machine in operation, a second handle for controlling the direction of movement of the spindle, means on the disc for releasing the weight and for controlling the operative position of the second handle, and other means on the disc for controlling the operative position of the first handle.

6. A machine for milling the spiral slot of an auger bit comprising, a spindle mounted to move axially and rotatively and carrying a chuck for holding the bit, a pair of oppositely disposed, angularly arranged cutters mounted to move toward and from the bit, means for imparting a simultaneous axial and rotative movement to the spindle to advance the bit between the cutters into position for the beginning of the slot cutting operation, means for reversing the direction of movement of the spindle, a weight connected with the cutters and arranged, when released, to move them toward each other into slot cutting position, means for holding the weight in raised position, a disc connected with and driven by the means for actuating the spindle, a handle for controlling the direction of movement of the spindle, and means on the disc for releasing the weight when the bit is in position for the beginning of the slot cutting operation, said means on the disc acting simultaneously to change the position of the handle for the slot cutting operation.

7. A machine for milling the spiral slot of an auger bit comprising, a spindle mounted to move axially and rotatively and carrying a chuck for holding the bit, a pair of oppositely disposed, angularly arranged cutters mounted to move toward and from each other, means for imparting a simultaneous axial and rotative movement to the spindle so that the spiral slot may be cut in the bit, means for moving the bit into position for the beginning of the slot cutting operation, a rotating disc driven by the means for actuating the spindle, a handle for controlling the direction of movement of the spindle, means for holding the handle raised while the bit is moving into position for the beginning of the slot cutting, a dog on the disc for releasing the handle to reverse the movement of the spindle, and a weight connected with the cutters and arranged when released to move the cutters toward each other, said dog acting, when releasing the handle, to release the weight.

8. A machine for cutting spiral slots comprising, a spindle mounted to move axially and rotatively and carrying a chuck for holding the work in which the spiral slot is to be cut, a cutter, said spindle having a threaded portion, a threaded sleeve mounted on the threaded part of the spindle, means for turning the sleeve to impart an axial movement to the spindle, a bushing mounted to slide on the spindle and to turn therewith, means for turning the bushing to rotate the spindle, means for reversing the axial and rotative movements of the spindle, a disc connected with and driven by the means for actuating the spindle, said disc turning in one direction when the work is advanced toward the cutter and turning in the opposite direction when the work is withdrawn from the cutter, a handle for starting the machine in operation, a second handle for controlling the direction of movement of the spindle, means on the disc for engaging with the first handle to stop the machine, means on the disc to engage with the second handle to reverse the movements of the spindle, and means for advancing the cutter toward the work when the movements of the spindle are reversed.

9. A machine for cutting spiral slots comprising, a spindle mounted to move axially and rotatively and carrying a chuck for holding the work in which the spiral slot is to be cut, a cutter, means for imparting an axial movement to the spindle in two directions, means for imparting a rotative movement to the spindle in two directions, means for reversing the axial and rotative movements of the spindle, a disc connected with and driven by the means for actuating the spindle, a handle for starting the machine in operation, a second handle for controlling the direction of movement of the spindle, and means connected with the disc for controlling the operative positions of the handles according to the position of the work with respect to the cutter.

10. A machine for cutting spiral slots comprising, a spindle mounted to move axially and rotatively and carrying a chuck to hold the work, a cutter, means for imparting a simultaneous axial and rotative movement to the spindle, means for reversing the axial and rotative movements of the spindle, a disc driven by the means for actuating the spindle, a handle for starting the machine in operation, a second handle for controlling the direction of movement of the spindle, a dog on the disc for actuating the second handle to reverse the direction of movement of the spindle, and means for advancing the cutter toward the word for cutting the slot, said dog acting to operate the last named means when the work is in position for the slot cutting operation.

11. A machine for milling the spiral slot of auger bits comprising, a spindle carrying a chuck for holding the bit, said spindle having a threaded portion, a threaded sleeve mounted on the threaded part of the spindle, a gear fixed on the sleeve, a worm gear loosely mounted on the spindle, means for driving the worm gear in one direction only, a driving gear fulcrumed in the web of the worm gear, an idler gear between the driving gear and the gear on the sleeve, a drum mounted to slide on the spindle, a gear on the drum, means for locking the gear on the drum against turning, means for shifting the drum into engagement with the worm gear to turn therewith, a pinion connected with the driving gear and adapted to mesh with the gear on the drum, a bushing mounted to slide on and turn with the spindle, a gear on the bushing, connections between the gear on the bushing and the sleeve by which rotative movements are imparted to the spindle, a cutter, means for starting the machine in operation to advance the bit past the cutter, and means for moving the cutter toward the bit to cut the slot.

12. A machine for milling the spiral slot of an auger bit provided with a body portion, a shank and a tang, comprising, a spindle carrying a chuck to hold the bit by the tang, a pair of oppositely disposed cutters mounted to move toward and from each other, said spindle being provided with a threaded portion, a threaded sleeve mounted on the threaded part of the spindle, a gear fixed on the sleeve, a worm gear loosely mounted on the spindle, means for turning the worm gear in one direction only, a driving gear fulcrumed in the web of the worm gear, an idler gear between the driving gear and the gear on the sleeve, a bushing mounted to slide on the spindle and to turn therewith, a gear fixed on the bushing, driving connections between the sleeve and the bushing, a drum having an internal gear, means for locking the drum to the worm gear to turn therewith, means for shifting the drum, means for holding the drum against turning, a pinion on the driving gear adapted to travel over the internal gear on the drum when the latter is held against turning, a disc driven by the means for actuating the spindle, a handle the position of which determines the direction of movement of the spindle, a weight connected with the cutters and arranged when it descends to move the cutters toward each other into slot cutting position, means for holding the weight in raised position and means connected with the disc for acting on the handle to change the direction of movement of the spindle and to release the weight to move the cutters into slot cutting position.

LARNED S. WHITNEY.